United States Patent [19]

Moore et al.

[11] 4,127,040

[45] Nov. 28, 1978

[54] LOCATED BELT

[75] Inventors: Alvin C. Moore, Charlotte, N.C.; Henry K. Bern, Pequannock, N.J.

[73] Assignee: A.J. Sparks & Company, Grand Rapids, Mich.

[21] Appl. No.: 810,641

[22] Filed: Jun. 27, 1977

[51] Int. Cl.² .......................... F16H 7/18; F16G 1/28
[52] U.S. Cl. .................................... 74/240; 74/231 C
[58] Field of Search ................. 74/240, 231 C, 231 R

[56] References Cited

U.S. PATENT DOCUMENTS 4,008,801  2/1977  Reilly et al. ...................... 74/231 C Primary Examiner—Leonard H. Gerin
Attorney, Agent, or Firm—Glenn B. Morse

[57] ABSTRACT

A flat belt is provided with spaced cleats aligned along the length of the belt for non-driving engagement with a peripheral pulley groove. The cleats are cast in place with a form system installed temporarily on opposite sides of a groove in the covering layer of the belt that exposes the core material for bonding.

5 Claims, 6 Drawing Figures

LOCATED BELT

BACKGROUND OF THE INVENTION

Flat belting of substantial width is used very frequently in conveyor systems. The path of a conveyor belt is established by appropriate placement of a series of pulleys, and it is obviously important to prevent the belt from working its way axially with respect to the pulley to the point where it either slips off the pulley, or begins to abrade the surrounding structure. Belts have been confined against lateral movement either by end-flanges on the pulleys, by rollers or abutments bearing on the edges of the belt, or occasionally by continuous ridges incorporated in the belt for engagement with annular grooves in the pulleys. The ridged belt has many advantages, but a side effect of the presence of the ridge is to very substantially increase the bending rigidity of the belt as a result of the sudden and highly localized increase in the sectional moment of inertia in the portion of the belt at and adjacent to the ridge. This added stiffness presents a difficulty as the belt passes over a pulley, and is consequently forced into a predetermined curvature. The flexing action has a tendency to tear away the ridge material, unless it is exceptionally resilient, and materials of this characteristic are not notable for their wear resistance or for their ability to positively locate the belt with a firm engagement in the pulley groove. The present invention is directed at providing the advantages of the ridge belt without the problems that have heretofore been associated with it.

SUMMARY OF THE INVENTION

A series of spaced cleats are aligned along the length of a belt, preferably in the central area. These cleats are cast in a groove machined through the covering layer of the belt to expose the core material. Form rails are placed on opposite sides of the groove, with spacing plugs interposed at predetermined intervals. Preferably, the plugs bridge across the grooves so that the initially liquid material forming the cleats can flow underneath the plugs and fill the groove in this area, so that the material of the cleats is continuous, rather than completely interrupted. After initially liquid material is cast in the spaces between the plugs, it is permitted to set under the particular conditions associated with that material so that it will solidify properly. The forms are then removed, and re-positioned so that a particular length of belting is treated at each operation.

DESCRIPTION OF THE DRAWINGS

FIG. 4 is a perspective sectional view showing the completely assembled relationship of the mold components.

FIG. 6 is a perspective view showing one of the spacing plugs of the mold system.

DESCRIPTION OF THE PREFERRED EMBODIMENT

Figure 1:
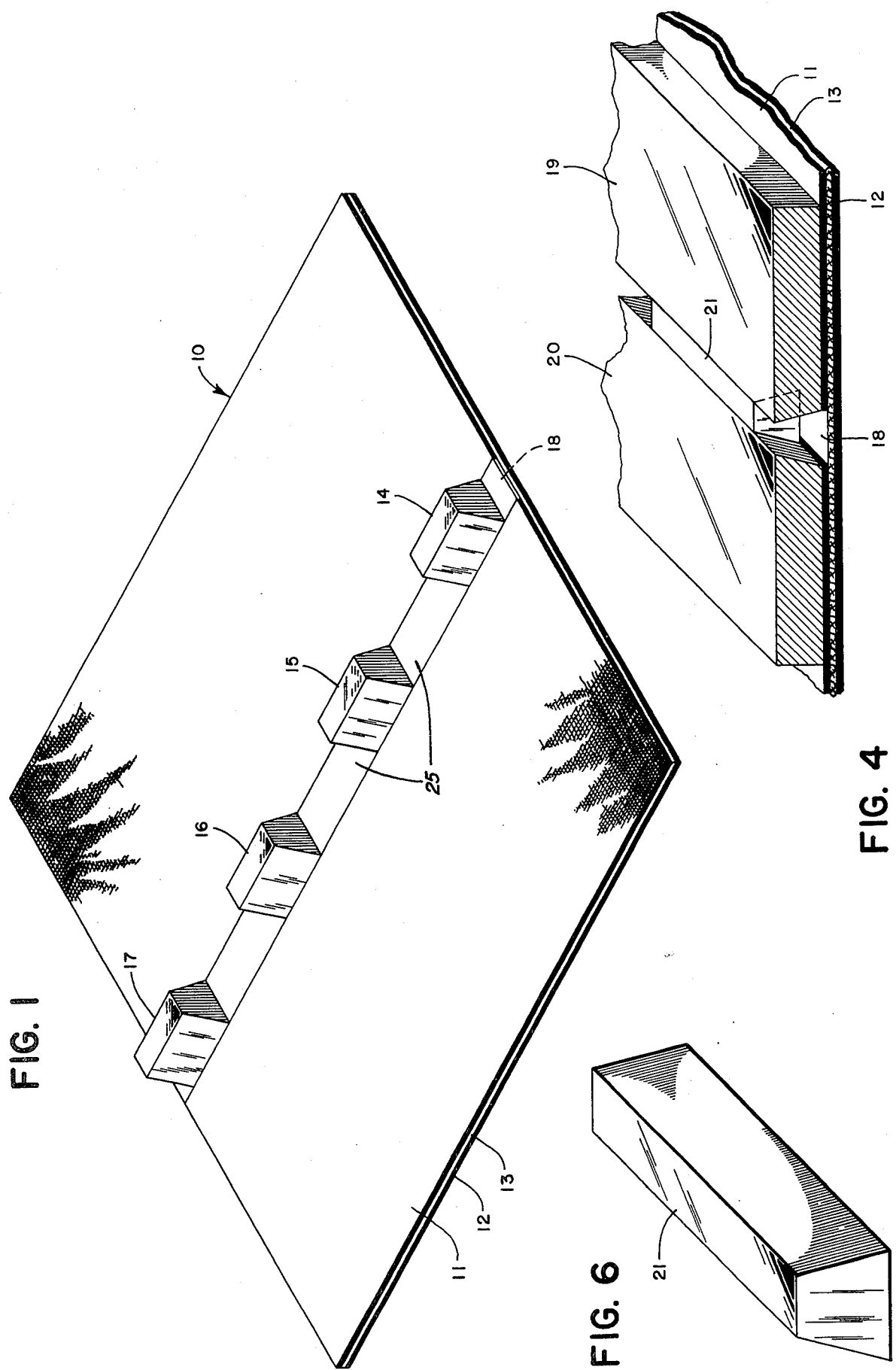
FIG. 1 is a perspective view showing a section of belting incorporating the present invention.
Figure 3:
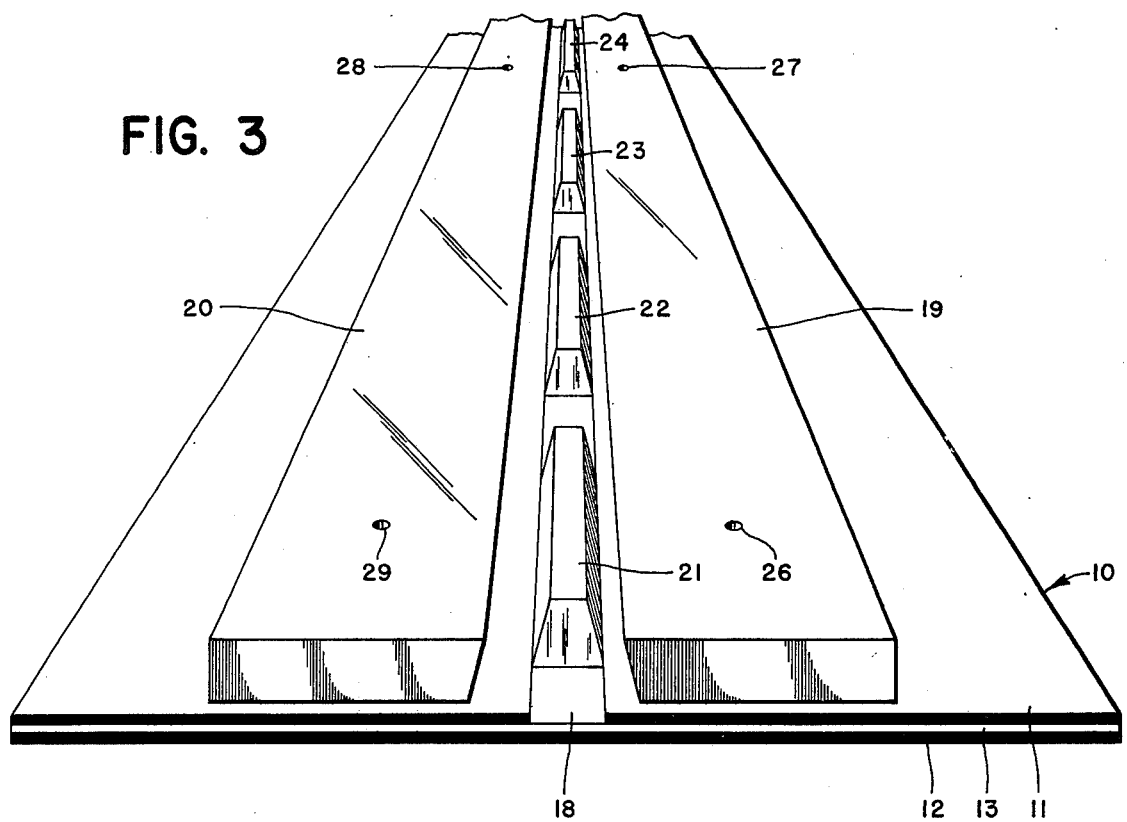
FIG. 3 is a perspective view showing the assembly of the mold components preparatory to pouring the cleat material.
Figure 5:
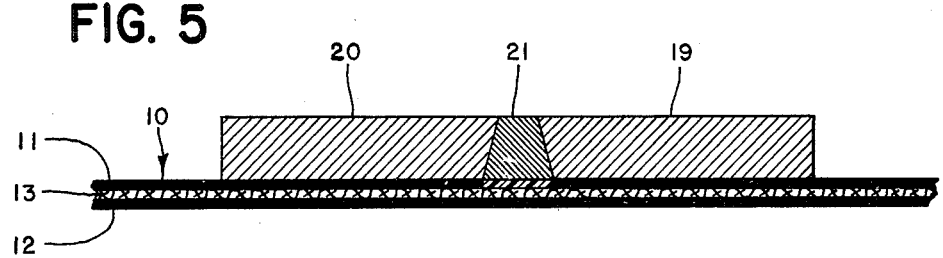
FIG. 5 is a perspective view through the mold components after the pouring of the plastic cleat material.

The belt indicated in FIG. 1 at 10 has the upper and lower covering layers 11 and 12, and the central fabric core 13. The series of cleats 14–17 are incorporated in the belt through the use of separable mold components, as best shown in FIG. 3. A groove 18 is first machined in the belt through the covering layer 11 to expose the core material 13. The core is usually of fabric or parallel fibers, and is provided to establish the necessary strength in tension. The nap of this core material in the groove is then raised with a wire brush to improve the bonding conditions. The rails 19 and 20 are placed on the belt surface as shown in FIG. 3, and are then aligned with a group of spacer plugs 21–24. The sides of these plugs, and the adjacent edges of the rails 19 and 20 are inclined to produce the trapezoidal sectional configuration usually associated with a V-belt. The lateral width of the plugs is preferably such that they are just capable of bridging across the groove 18, so that a space will exist underneath the plugs, as shown in FIG. 5. It is often desirable to secure the relationship of the rails and plugs by driving nails through holes as shown at 26–29 in the rails, and through the belting and possibly into the surface of a supporting table on which the work is being performed.

When the form components are properly placed, an initially liquid plastic material is poured in the spaces between the plugs, and permitted to flow underneath the plugs as well as fill the spaces in between. The forms are left in position for a sufficient length of time, and under predetermined conditions, to cause the initially liquid material to set into a tough solid. The gaps between the cleats permit the use of a material such as polyurethane, the stiffness of which would otherwise make it impractical for such applications. The plugs 21–24 are preferably spaced to give a cleat length short enough to permit the belt to pass around available pulley diameters without inducing too sharp a curvature for the belt to withstand. A cleat length of approximately one inch has worked very effectively with belt thickness on the order of one-eighth of an inch. A spacing between the cleats on the order of one and a half cleat lengths will normally be sufficient to maintain the necessary belt flexibility. The continuity of the polyurethane between the cleats fills the belt groove as shown at 25, and adds its bonding effect to that existing directly underneath the cleats. This effect can be increased further by incorporating a slight radius in the ends of the cleat where they bridge across the groove.

Figure 2:
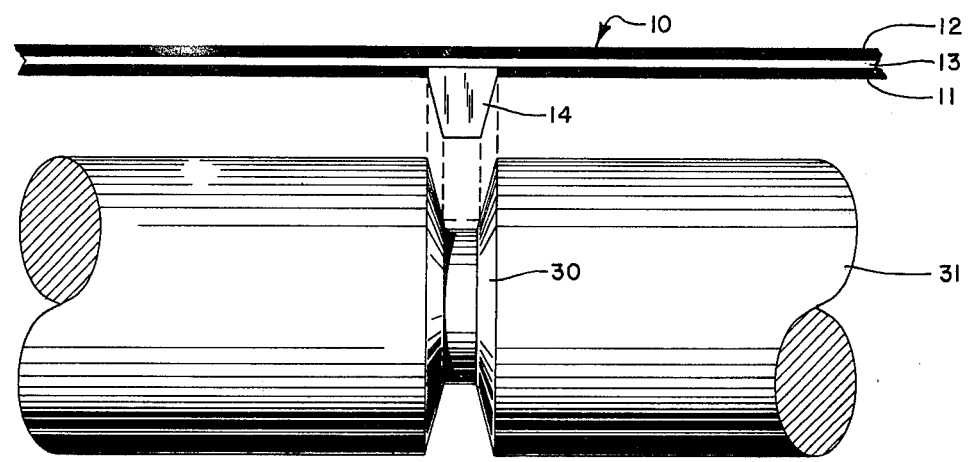
FIG. 2 is a fragmentary sectional elevation in "exploded" relationship, showing the interengagement of the belting illustrated in FIG. 1 with a pulley.

A predetermined length of the belting is treated at one time by the mold system, producing a given number of cleats. When the material has set, the rails and spacing plugs are removed and advanced to the next position along the belt. The last cleat formed can thus serve to locate the rails at this point for the next setting. When the full length of belt has been prepared in this manner, the resulting cleats are adapted to interengage with the annular peripheral groove 30 of a pulley 31, as shown in FIG. 2. The dimensional relationship between the cleats and the groove should be such that the cleats are loosely received between the converging walls of the groove, and the end of the cleats does not bottom in the groove. This completely eliminates any driving relationship, and limits the functioning of the cleats to the lateral placement of the belt with respect to the pulley 31. The cleats are thus free to any tendency for the driving forces to tear them loose from their bonded engagement with the belting.

We claim:

1. A belt for engagement with a pulley having a peripheral groove, said belt having a central core material and a covering layer over said core material, and a lengthwise groove in said covering layer to said core material, wherein the improvement comprises:
   a plurality of cleats bonded to said belt at said belt groove at least at the bottom thereof, and disposed in spaced relationship along said belt.

2. A belt as defined in claim 1, wherein said cleats are cast of a material different from said belt, and said belt groove between said cleats is substantially filled with said cast material.

3. A method of providing a series of spaced cleats in alignment along the length of a belt, said belt having a core material and a covering layer over said core material, comprising:
   forming a groove parallel to the length of said belt, said groove extending through said covering layer and exposing said core material;
   placing form rails along the opposite sides of said groove, respectively, and placing plugs between said rails and above said groove, said rails and plugs being at least adjacent a contacting relationship;
   pouring an initially liquid settable material in the spaces between said rails unoccupied by said plugs, and subjecting said material to conditions required to solidify it; and
   removing said rails and plugs.

4. A method as defined in claim 3, wherein said plugs bridge across said belt groove.

5. A method as defined in claim 3, additionally including securing said rails laterally with respect to said belt before pouring said initially liquid material.

* * * * *